Sept. 1, 1964  J. J. CHYLE  3,147,089
ALLOY BRAZING COMPOSITION AND METHOD OF BRAZING
Filed July 20, 1961

INVENTOR.
John J. Chyle
BY Andrus & Starke
Attorneys

United States Patent Office 3,147,089
Patented Sept. 1, 1964

3,147,089
ALLOY BRAZING COMPOSITION AND
METHOD OF BRAZING
John J. Chyle, Wauwatosa, Wis., assignor to A. O. Smith Corporation, Milwaukee, Wis., a corporation of New York
Filed July 20, 1961, Ser. No. 125,576
9 Claims. (Cl. 29—198)

This invention relates to a brazing alloy and to a method of brazing.

In many applications it is more practical and less expensive to braze metals rather than weld. For example, brazing is used when joining nozzles to thin sheet material or when joining heavy parts of thick section. In addition, brazing is employed when joining finished parts, for the brazing operation does not affect the physical properties of the joined members and no machining is required after the brazing operation.

In the usual brazing operation the articles to be brazed are initially cleaned, either by grit or shot blasting, pickling or the like, and the brazing material, in the form of powder, strip or sheets, is disposed between the surfaces of the articles to be joined. The articles are then heated to a temperature above the melting point of the brazing alloy and below the melting point of the articles and pressure is simultaneously applied to the articles. On solidifying of the brazing alloy, a firm bond is provided between the articles.

In most brazing operations, a flux is disposed between the articles to be joined, along with the brazing alloy, to increase the flow characteristics of the brazing alloy. However, small islands or isolated areas of flux generally remain in the completed braze which frequently results in a lack of bond between the two articles.

The present invention is directed to a brazing alloy composed of iron, manganese and carbon or iron and carbon, which provides a firm adherent bond between the members to be joined and eliminates the use of flux in the brazing operation. The brazing alloy has a high capillary action, enabling it to creep between the surfaces to be joined, making the brazing alloy particularly useful where the surfaces have an irregular shape or contour.

The brazing alloy has particular application in brazing corrosion resistant metals, such as stainless steel, to carbon steel, and in this application no fusion takes place in the stainless steel, for the bonding is strictly a surface brazing of the stainless steel and there is no dilution of the stainless steel.

Other objects and advantages will appear in the course of the following description.

The drawings illustrate the best mode presently contemplated of carrying out the invention.

Figure 1:
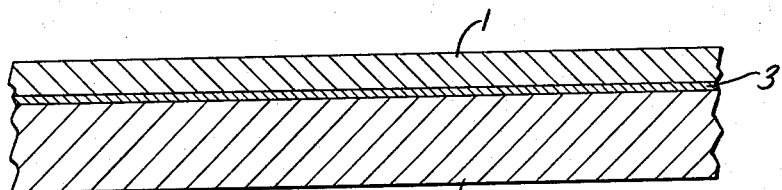
Figure 2:
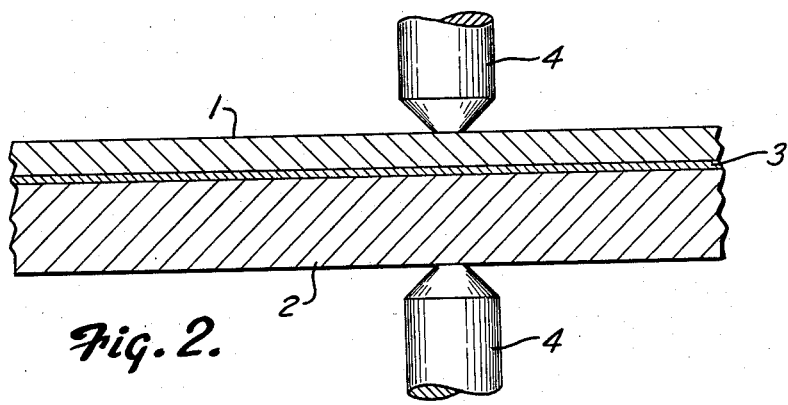

In the drawings:
FIGURE 1 is a sectional view of a brazed article; and
FIG. 2 is a sectional view showing two articles being brazed by a spot welding apparatus.

FIGURE 1 illustrates a brazed structure fabricated in accordance with the invention and including a plate 1 which is joined or bonded to a plate 2 by a layer of a brazing alloy 3.

The brazing alloy of the invention has the following composition in weight percent.

Alloy 1: Percent
  Carbon _____ 0.5– 8.0
  Manganese _____ 60.0–90.0
  Iron _____ Balance
Alloy 2:
  Carbon _____ 0.5– 8.0
  Iron _____ Balance Specific compositions of the brazing alloy falling within the above mentioned ranges are as follows in weight percent.

Alloy 1: Percent
  Carbon _____ 5.5
  Manganese _____ 80.0
  Iron _____ 14.5
Alloy 2:
  Carbon _____ 5.5
  Iron _____ 94.5

The plates 1 and 2 or other articles to be brazed by use of the composition of the invention may be any ferrous material, such as carbon steel, tool steel, low alloy steel and stainless steel. Typical examples of ferrous materials to be employed are as follows in weight:

| Percent | Carbon Steel A-212 | Low Alloy Steel SAE-4340 | Stainless Steel Type 304 | Tool Steel Regin 711 |
|---|---|---|---|---|
| C | .31 | .35/.45 | .08 max. | .50 |
| Mn | .90 | .50/.80 | 2.00 max. | .20 |
| P | .04 max. | .04 max. | | |
| S | .05 max. | .05 max. | | |
| Si | .15/.30 | | | .75 |
| Cr | | .50/.80 | 18.0/20.0 | 1.15 |
| Ni | | 1.5/2.0 | 8.0/10.0 | |
| Mo | | .3/.4 | | |
| V | | .10/.25 | | .20 |
| W | | | | 2.50 |

In carrying out the process of the invention the surfaces of the articles 1 and 2 to be brazed together are initially cleaned by any of the conventional cleaning processes such as pickling, grit blasting, sand blasting, grinding or the like. The brazing composition is then applied to either one or both of the cleaned surfaces. Generally the brazing alloy is in the form of a finely divided powder but it may also be used in the form of strip or sheet material. As an alternate method, the brazing composition can also be applied to the clean surfaces in the form of a suspension or slurry. In this case the finely divided particles of the brazing alloy are suspended in an evaporable liquid, such as alcohol, and sprayed as a slurry onto the surface of the article. The evaporable solvent will evaporate, leaving a coating of the brazing alloy on the surface of the article.

The brazing alloy 3 is applied to the ferrous base with a thickness in the range of about 0.005 to 0.030 inch. If the brazing alloy is applied to both surfaces to be joined, the combined total thickness of the two layers of the brazing material should fall within this range.

The composite structure is then heated to a temperature above the melting point of the brazing alloy and beneath the melting point of the articles 1 and 2 to be joined and generally to a temperature in the range of 1800° F. to 2600° F. Heat can be supplied by resistance heating, oven heating, or the like. Simultaneously with the heating, pressure in the range of 500 to 10,000 p.s.i. is applied to the plates 1 and 2 by means of movable platens or dies. The pressure reduces the bonding alloy to film-like dimensions and thoroughly distributes the alloy between the mating surfaces to be joined.

In combination with the heat and pressure, an inert or reducing gas is supplied to the area of brazing to provide a shield or envelope and thereby prevent the presence of oxygen in the brazing area. The inert gas can take the form of a gas such as argon, helium or the like and the reducing gas can be carbon monoxide, methane, or the like. The inert or reducing gas serves to prevent oxidation of the molten brazing alloy and thereby provides a more adherent, uniform bond between the articles.

As shown in FIG. 2, the heat and pressure can also be applied to the articles by means of a spot welding apparatus. In this embodiment the brazing alloy 3 is disposed between the plates or articles 1 and 2 and pressure and heat are applied on the opposite surfaces of the plates through a pair of spot welding electrodes 4. The heat and pressure developed by the electrodes serve to melt the brazing alloy 3 and provide a bond between the two articles 1 and 2.

The brazing alloy of the invention has a high capillary or wetting action and will move or creep into all areas of the joint between the members and is particularly useful where the joint has an irregular shape or contour. It is believed that the carbon in the brazing alloy reduces the melting point of the eutectoid composition and provides the high wetting action.

The bond produced between the members is particularly strong due to the fact that fluxing materials are not required and this eliminates any islands or isolated areas of flux in the brazed joint.

The brazing material can be used with various types of ferrous base materials, such as carbon steel, tool steel, low alloy steel and stainless steel and provides a surface brazing of the members which eliminates dilution of the more expensive high alloy materials such as stainless steel.

Various modes of carrying out the invention are contemplated as being within the scope of the following claims particularly pointing out and distinctly claiming the subject matter which is regarded as the invention.

I claim:

1. A composite structure, comprising a first ferrous member, a second ferrous member, and an intermediate layer of a brazing alloy disposed between said first and second ferrous members and bonding said members together, said alloy consisting essentially of 0.5% to 8.0% carbon, 60.0% to 90.0% manganese and the balance iron.

2. A composite structure, comprising a first ferrous member, a second ferrous member, and an intermediate layer of a brazing alloy disposed between said first and second ferrous members and bonding said members together, said alloy consisting essentially of 0.5% to 8.0% carbon and the balance iron.

3. The structure of claim 1, in which the ferrous members are selected from the group consisting of carbon steel, tool steel, low alloy steel and stainless steel.

4. A method of brazing, comprising the steps of applying a layer of a brazing alloy between two articles to be joined together to provide a composite structure, said alloy consisting essentially of 0.5% to 8.0% carbon, 60.0% to 90.0% manganese and the balance iron, heating the composite structure to a temperature above the melting point of the brazing alloy and beneath the melting point of the ferrous articles while simultaneously applying pressure to the articles to force said articles together, and supplying a non-oxidizing gas to the area of brazing to prevent oxidation of said brazing alloy.

5. A method of brazing, comprising the steps of cleaning the surfaces of two metal articles to be joined together, disposing a brazing alloy between the cleaned surfaces to provide a composite structure, said brazing alloy consisting essentially of 0.5% to 8.0% carbon, 60.0% to 90.0% manganese and the balance iron, and heating the composite structure to a temperature in the range of 1800° F. to 2600° F. while simultaneously applying pressure to the articles to force said surfaces together.

6. The method of claim 5 in which the brazing alloy is in the form of finely divided particles.

7. A method of brazing, comprising the steps of applying a layer of a brazing material between two articles to be joined together to provide a composite structure, said material having a thickness in the range of 0.005 to 0.03 inch and being selected from the group consisting of (a) an alloy consisting essentially of 0.5% to 8.0% carbon, 60.0% to 90.0% manganese and the balance iron and (b) an alloy consisting essentially of 0.5% to 8.0% carbon and the balance iron, heating the composite structure to a temperature in the range of 1800° F. to 2600° F. to melt the brazing material while simultaneously applying pressure to the articles to force the articles together, and cooling the articles to solidify the brazing material and produce a firm adherent bond between the articles.

8. A method of brazing, comprising the steps of cleaning the surfaces of two articles to be joined together, applying a suspension of finely divided particles of a brazing alloy in an evaporable liquid to at least one of said surfaces, evaporating the evaporable liquid to provide a coating of said brazing alloy on the surface, said alloy consisting essentially of 0.5% to 8.0% carbon, 60.0% to 90.0% manganese and the balance iron, disposing the surfaces of said articles in opposed relation with the coating of the brazing alloy located intermediate said surfaces to provide a composite structure, heating the composite structure to a temperature above the melting point of the brazing alloy and beneath the melting point of the ferrous articles while simultaneously applying pressure to the articles to force the articles together, and supplying a non-oxidizing gas to the area of brazing to prevent oxidation of said brazing alloy.

9. A method of brazing, comprising the steps of cleaning the surfaces of two metal articles to be joined together, disposing a brazing alloy between the cleaned surfaces to provide a composite structure, said brazing alloy consisting essentially of 0.5% to 8.0% carbon, 60.0% to 90.0% manganese and the balance iron, engaging an electrode with the opposite surface of each of said articles, supplying electrical energy to said electrodes to thereby generate heat to melt the brazing alloy, and subsequently cooling the composite structure to solidify the brazing alloy and provide a firm adherent bond between the articles.

References Cited in the file of this patent

UNITED STATES PATENTS

| 2,480,351 | Anderson | Aug. 30, 1949 |
| 3,005,258 | Sangdahl et al. | Oct. 24, 1961 |

FOREIGN PATENTS

| 570,999 | Canada | Feb. 17, 1959 |

OTHER REFERENCES

Metals Handbook, 8th Edition, vol. I, 1961, page 389.